United States Patent
Cao

(10) Patent No.: US 9,197,589 B2
(45) Date of Patent: Nov. 24, 2015

(54) COMMUNICATION DEVICE HAVING INSTANT MESSAGING SOFTWARE AND METHOD FOR MAKING PHONE CALL

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Dan Cao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 15 days.

(21) Appl. No.: 14/106,810

(22) Filed: Dec. 15, 2013

(65) Prior Publication Data

US 2014/0179282 A1    Jun. 26, 2014

(30) Foreign Application Priority Data

Dec. 26, 2012    (CN) .......................... 2012 1 05735715

(51) Int. Cl.
*H04M 3/42* (2006.01)
*H04L 12/58* (2006.01)
*H04W 4/02* (2009.01)

(52) U.S. Cl.
CPC ............. *H04L 51/046* (2013.01); *H04W 4/023* (2013.01)

(58) Field of Classification Search
CPC ..... H04W 4/023; H04W 4/025; H04L 51/046
USPC ............................. 455/414.1, 414.2, 415, 416
See application file for complete search history.

(56) References Cited

U.S. PATENT DOCUMENTS

| | | | |
|---|---|---|---|
| 2008/0082943 A1* | 4/2008 | Chung et al. .................. | 715/835 |
| 2009/0234922 A1* | 9/2009 | Appelman ..................... | 709/206 |
| 2013/0040710 A1* | 2/2013 | Lockwood .................... | 455/566 |
| 2013/0290494 A1* | 10/2013 | Goudarzi et al. ............. | 709/219 |

* cited by examiner

*Primary Examiner* — Wayne Cai
(74) *Attorney, Agent, or Firm* — Novak Druce Connolly Bove + Quigg LLP

(57) ABSTRACT

A communication device includes an instant messaging software (IMS) and a sensor. When an object nearby the sensor is detected, a trigger signal is generated by the sensor. When the IMS is activated to communicate with a target contact and the trigger signal is generated, communication content between a user of the communication device and the target contact within a predetermined time interval is analyzed to determine whether or not the communication content includes a phone number. If the communication content includes a phone number, a phone call between the communication device and the phone number is made.

14 Claims, 3 Drawing Sheets

COMMUNICATION DEVICE HAVING INSTANT MESSAGING SOFTWARE AND METHOD FOR MAKING PHONE CALL

BACKGROUND

1. Technical Field

Embodiments of the present disclosure relate to instant messaging technologies, and particularly to a communication device having an instant messaging software and a method for making a phone call.

2. Description of Related Art

Instant messaging software (IMS), such as MSN®, QQ®, and Gtalk®, is becoming more and more popular. Many communication devices, such as smart phones and tablet computers, are installed with the IMS, to provide instant messaging service for a user. When the user uses the IMS to communicate with others, and if the user wants to make a phone call to someone who is communicating with the user via the IMS, the user may need to exit the IMS to make the phone call, which is very inconvenient. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
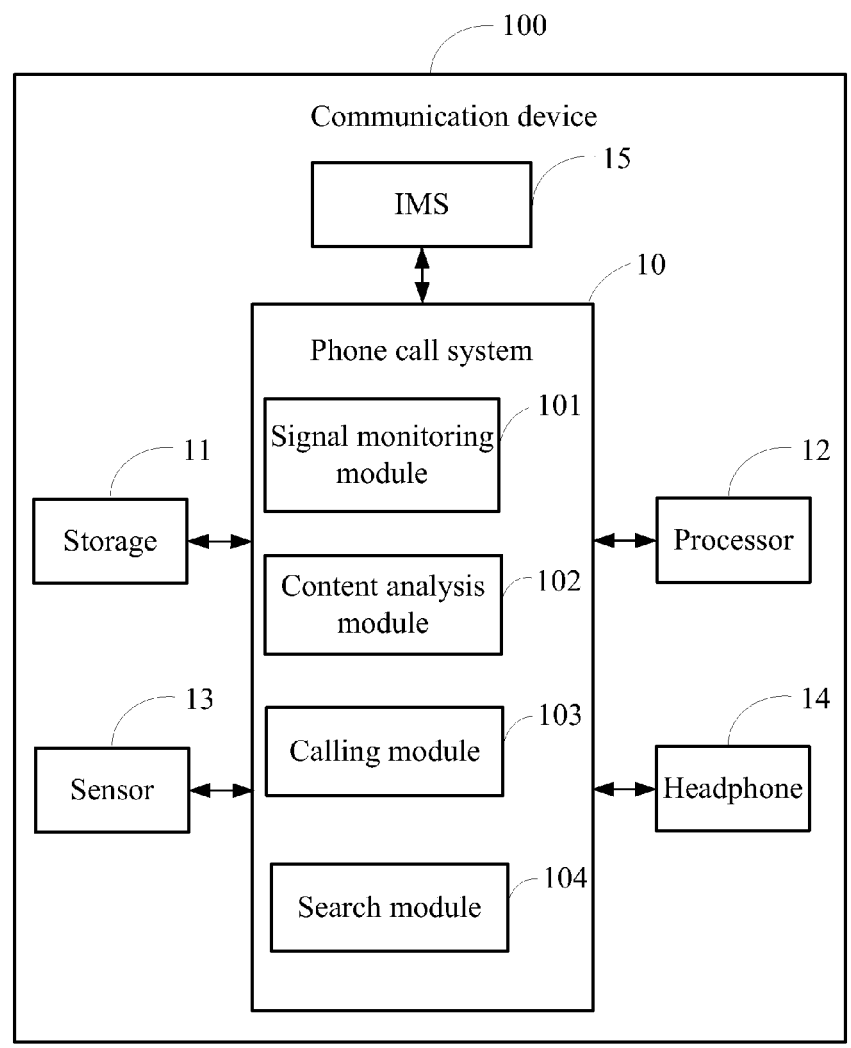
FIG. 1 is a schematic block diagram illustrating one embodiment of a communication device.

FIG. 1 is a schematic block diagram illustrating one embodiment of a communication device 100. The communication device 100 includes a phone call system 10, a storage 11, a processor 12, a sensor 13, a headphone 14, and an instant messaging software (IMS) 15. The IMS 15 may be, for example, MSN®, QQ®, and Gtalk®, which is pre-installed in the communication device 100. FIG. 1 shows one embodiment of the communication device 100, and it can include more or fewer components than those shown in the embodiment, or have a different configuration of the components.

Figure 2:
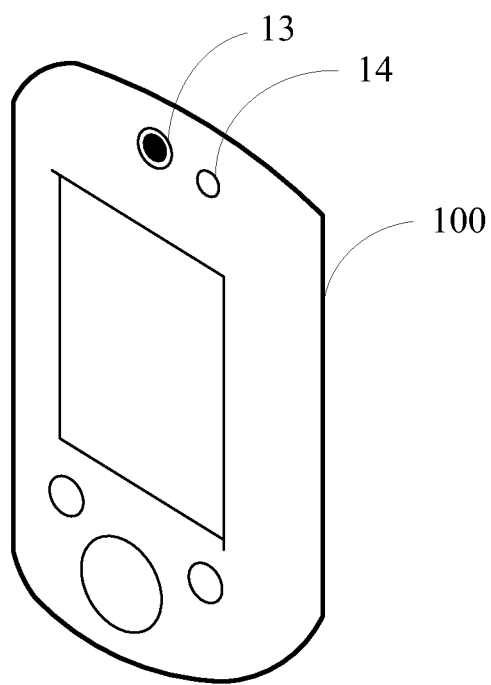
FIG. 2 is a schematic view of a headphone and a sensor of the communication device of FIG. 1.

The sensor 13 senses a presence of objects nearby the sensor 13, and generates a trigger signal when an object is detected nearby the sensor 13. In this embodiment, the sensor 13 is a proximity sensor configured to detect a nearby presence of a user, and generate the trigger signal when the user nearby the sensor 13 is detected. In one embodiment, the sensor 13 detects a distance between an object (e.g., the user or a portion of the user) and the sensor 13. When the detected distance is less than a predetermined threshold distance, the sensor 13 generates the trigger signal. When the trigger signal is generated, the communication device 100 can perform a corresponding function in response to the trigger signal. As shown in FIG. 2, the sensor 13 can be arranged near the headphone 14. When the user answers a phone call, the sensor 13 can sense the user is nearby the sensor 13, and the sensor 13 generates the trigger signal to control the communication device 100 to power off a display screen (not show) to save power and to prevent mistaken operations. In other embodiments, the sensor 13 can be a light sensor. When a light intensity sensed by the light sensor is less than a predetermined level of light intensity, the trigger signal is generated by the light sensor.

The phone call system 10 can include a plurality of programs in the form of one or more computerized instructions stored in the storage 11 and executed by the processor 12 to perform operations of the communication device 100. In the embodiment, the phone call system 10 includes a signal monitoring module 101, a content analysis module 102, a calling module 103, and a search module 104. The storage 11 may be an external or embedded storage medium of the communication device 100, such as a secure digital memory (SD) card, a Trans Flash (TF) card, a compact flash (CF) card, or a smart media (SM) card.

In general, the word "module," as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage devices. Some non-limiting examples of non-transitory computer-readable medium include CDs, DVDs, BLU-RAY, flash memory, and hard disk drives.

Figure 3:
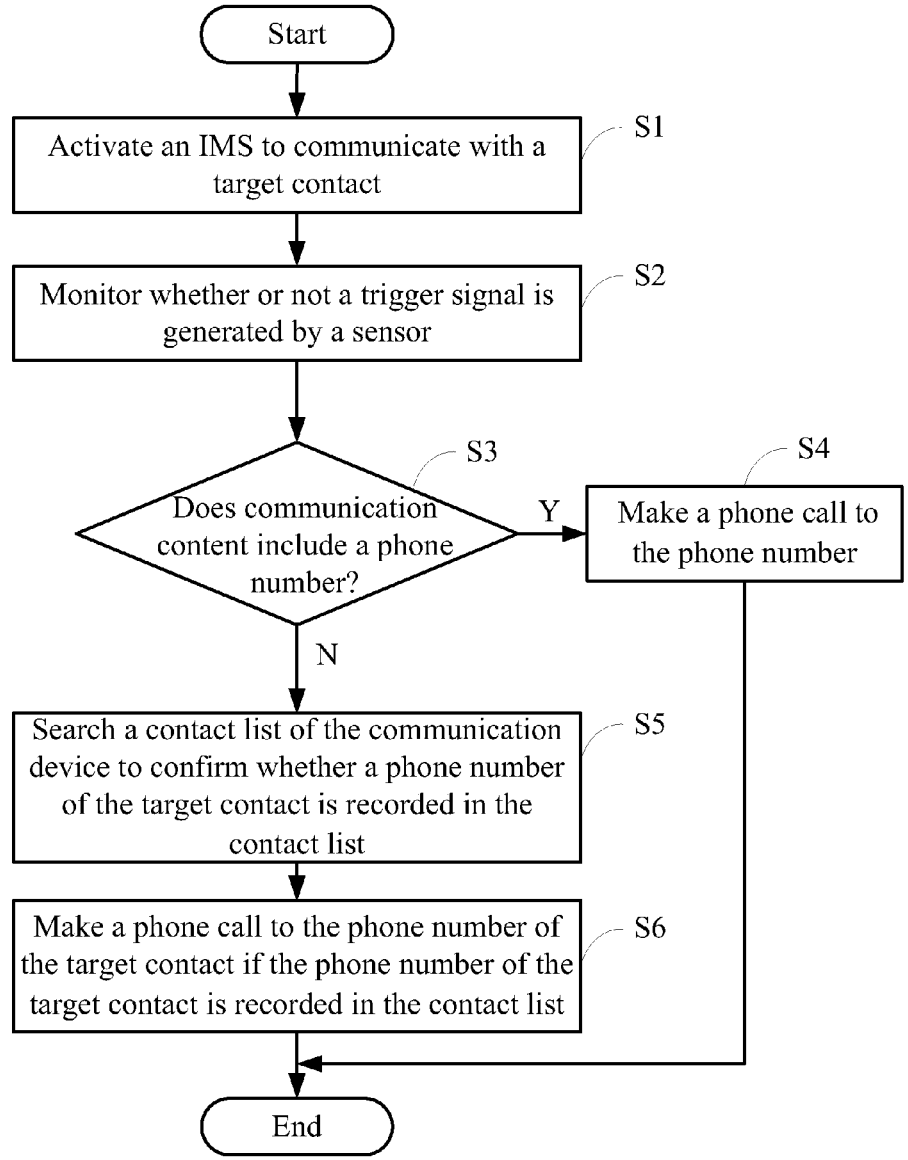
FIG. 3 is a flowchart of one embodiment of a method for making a phone call using the communication device of FIG. 1.

FIG. 3 shows a flowchart of one embodiment of a method for making a phone call using the functional modules of the phone call system 10 of the communication device 100. Depending on the embodiment, additional steps may be added, others removed, and the ordering of the steps may be changed.

In step S1, the IMS 15 is activated to communicate with a target contact. In this embodiment, the target contact can use an external device which is installed with a same IMS 15 to communicate with the user of the communication device 100.

In step S2, the signal monitoring module 101 monitors, in real-time, whether or not the trigger signal is generated by the sensor 13.

In step S3, when the trigger signal is monitored, the content analysis module 102 analyzes communication content between the user of the communication device and the target contact within a predetermined time interval (e.g., 30 seconds or 1 minute), to determine whether or not the communication content includes a phone number. If the communication content includes a phone number, step S4 is implemented. Otherwise, if the communication content does not include a phone number, step S5 is implemented. In this embodiment, the communication content includes texts and images. A serial of numbers having a predetermined amount of (e.g., 8, 11, or 12) numbers is determined to be a phone number.

In step S4, the calling module 103 makes a phone call to the phone number included in the communication content, and the procedure ends. In other embodiments, if the communication content includes two or more phone numbers, the calling module 103 first generates a notification to notify the user of the communication device 100 to select a phone number from the two or more phone numbers, and then makes a phone call to the selected phone number.

In step S5, the search module 104 searches a contact list of the communication device 100 to confirm whether or not a phone number of the target contact is recorded in the contact list. In this embodiment, the search module 104 searches the contact list according to reference information of the target contact. For example, the reference information may be a name of the target contact recorded by the IMS 15.

In step S6, if the phone number of the target contact is recorded in the contact list of the communication device 100, the calling module 103 makes a phone call to the phone number of the target contact.

As described above, when the user of the communication device 100 is communicating with the target contact using the IMS 15, if the user of the communication device 100 wants to make a phone call to the target contact, the user can put the communication device 100 near the ear of the user, for example, to make the sensor 13 generate the trigger signal. Then, the phone call system 10 will automatically make the phone call to the target contact when the trigger signal is monitored. Thus, the user does not need to exit the IMS 15 to make the phone call, which is convenient.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for making a phone call using a communication device having an instant messaging software (IMS) and a sensor configured to detect a nearby object, the method comprising:
    monitoring, in real-time, whether or not a trigger signal is generated by the sensor when the IMS is activated to communicate with a target contact;
    analyzing communication content of a communication using the IMS between a user of the communication device and the target contact within a predetermined time interval, and determining whether or not the communication content comprises a phone number, when the trigger signal is generated by the sensor; and
    making a phone call to the phone number which is comprised in the communication content from the IMS when the communication content comprises the phone number.

2. The method according to claim 1, further comprising:
    searching a contact list of the communication device to confirm whether or not a phone number of the target contact is recorded in the contact list, when the communication content does not comprise the phone number; and
    making a phone call to the phone number of the target contact when the phone number of the target contact is recorded in the contact list of the communication device.

3. The method according to claim 1, wherein when the communication content comprises two or more phone numbers, the method further comprising:
    generating a notification to notify the user of the communication device to select a phone number from the two or more phone numbers; and
    making a phone call to the selected phone number.

4. The method according to claim 1, wherein the sensor is a proximity sensor that detects a presence of objects nearby the sensor, and the trigger signal is generated by the sensor when an object nearby the sensor is detected.

5. The method according to claim 1, wherein the sensor detects a distance between an object and the sensor, and generates the trigger signal when the detected distance is less than a predetermined threshold distance.

6. The method according to claim 1, wherein the sensor is a light sensor.

7. The method according to claim 6, wherein when a light intensity sensed by the light sensor is less than a predetermined level of light intensity, the trigger signal is generated by the light sensor.

8. A communication device, comprising:
    an instant messaging software (IMS);
    a sensor configured to detect a nearby object and to generate a trigger signal;
    a processor; and
    one or more programs executed by the processor to:
    monitor, in real-time, whether or not the trigger signal is generated by the sensor when the IMS is activated to communicate with a target contact;
    analyze communication content of a communication using the IMS between a user of the communication device and the target contact within a predetermined time interval, and determining whether or not the communication content comprises a phone number, when the trigger signal is generated by the sensor; and
    make a phone call to the phone number which is comprised in the communication content from the IMS when the communication content comprises the phone number.

9. The communication device according to claim 8, wherein the one or more programs are executed by the processor to further:
    search a contact list of the communication device to confirm whether or not a phone number of the target contact is recorded in the contact list, when the communication content does not comprise a phone number; and
    make a phone call to the phone number of the target contact when the phone number of the target contact is recorded in the contact list of the communication device.

10. The communication device according to claim 8, wherein the one or more programs are executed by the processor to further:
    generate a notification to notify the user of the communication device to select a phone number from the two or more phone numbers, when the communication content comprises two or more phone numbers; and
    make a phone call to the selected phone number.

11. The communication device according to claim 8, wherein the sensor is a proximity sensor that detects a presence of objects nearby the sensor, and the trigger signal is generated by the sensor when an object nearby the sensor is detected.

12. The communication device according to claim 11, wherein the sensor detects a distance between an object and the sensor, and generates the trigger signal when the detected distance is less than a predetermined threshold distance.

13. The communication device according to claim 8, wherein the sensor is a light sensor.

14. The communication device according to claim 13, wherein when a light intensity sensed by the light sensor is less than a predetermined level of light intensity, the trigger signal is generated by the light sensor.

* * * * *